Dec. 20, 1927.
R. B. BUCKLEY
SHINGLE
Filed Oct. 30, 1923
1,653,085
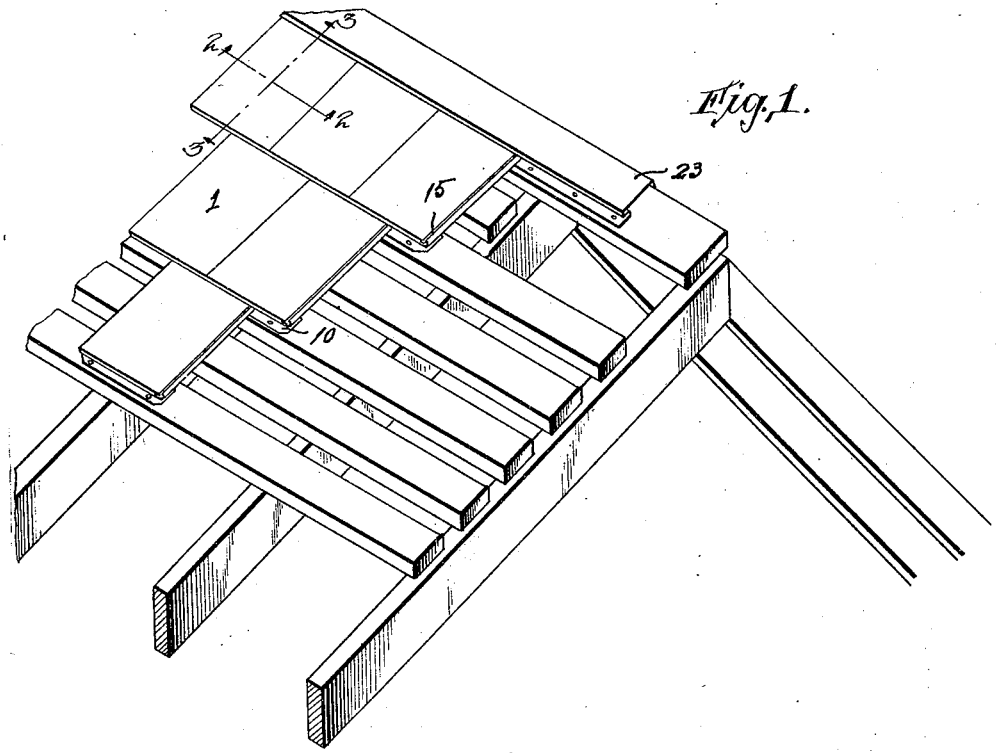

Patented Dec. 20, 1927.

1,653,085

UNITED STATES PATENT OFFICE.

ROY B. BUCKLEY, OF WICHITA, KANSAS.

SHINGLE.

Application filed October 30, 1923. Serial No. 671,720.

My invention relates to improvements in metallic shingles.

The object of my invention is to provide a metallic shingle wherein provision is made for firmly interlocking together adjacent sides of correspondingly formed shingles, and when so associated form tight and practically waterproof joints.

A further object of my invention is to provide a simple, inexpensive and efficient shingle, adapted to be readily applied on open sheathing or other forms of roof boards, and capable of being overlapped and interlocked in such a manner as to effectually prevent the elements from beating in under each shingle.

Still another object of my invention is to provide a shingle that may be applied upon a roof structure, such as that mentioned, starting from the top and working down and thus permitting the use of the open sheathing as a scaffold for the workman. In this manner of applying the shingles it will be noted that the ones that have been placed upon the roof are in no danger of being marred by the walking back and forth of the workman.

Another object of my invention is to provide a shingle adapted to permit an expansion and contraction of the same incident to the changes in temperature without loosening the fastening elements thereof.

With these and other objects in view, my invention finally consists in the particular construction of each shingle, the same being more clearly and fully hereinafter described and pointed out in the appended claim.

In the accompanying drawings:—

Figure 1 is a perspective view illustrating a section of a roof constructed in open sheathing fashion and having applied thereon a number of my improved shingles.

Figure 2 is an enlarged sectional view taken on the line 2—2 of Figure 1.

Figure 3 is a similar view taken on the line 3—3 of Figure 1.

Figure 4 is a detail sectional view showing the manner in which the sides of adjacent shingles are interlocked.

Figure 5 is a detail sectional view illustrating the manner in which the end portions of adjacent shingles are interlocked, and Figure 6 is a plan view of the blank from which the shingle is formed.

Referring to the accompanying drawings in detail, wherein like reference characters denote corresponding parts throughout the several views, the numeral 1 designates, in general, a metallic shingle constructed in accordance with my invention, the same being made of any suitable material and manufactured either plain or in ornamental patterns of any desired design.

As disclosed in Figure 6, it will be apparent that the blank from which the shingle is formed is substantially rectangular in shape and its edges have formed integral therewith certain projections which are adapted to be further bent to form interlocking elements whereby contiguous side portions of a plurality of such shingles may be firmly interlocked.

Referring to Figure 5, in connection with Figure 6, the upper edge of each shingle has its projection 2 bent down upon the dotted line 3 to form a locking tongue 4, the same adapted to be received within a groove formed upon the lower edge of the upper shingle, and in this case I will refer to the same as the shingle first applied. Upon referring to Figure 6 it will be noted that the tongue 4 does not extend the full width of the shingle body, thus allowing space upon each side for the interlocking movement which takes place when the sides of adjacent shingles are connected, as hereinafter fully described.

The lower edge of each shingle has its projection 5 bent down at right angles to the body upon the dotted line 6 and then back under the body upon the line 7, thus forming a definite edge for the lower portion of the shingle and giving the appearance of a wood shingle by reason of its sharp lines. The projection 5 is further bent down upon the line 8 and then back toward the lower edge of the shingle body upon the line 9, thus forming a portion 10 which is spaced from the main body of the shingle and extending slightly beyond its edge to form a nail receiving portion by which the shingle is attached to the sheathing. In the finished shingle the nail receiving portion 10, together with a small portion of the second bend is greater in width than the width of the shingle body, the purpose of which being to permit the edges of the nail receiving portion to project out and under the interlocking elements upon the sides of the shingle and into such a position that one of its ends will form an obstruction against which the correspondingly formed portion of the adjacent shingle will abut, thus limiting the sliding movement of one shingle with respect to the other and bringing into proper alignment those arranged in a row.

The side projection 11 is merely formed to provide a tongue 12 which is adapted to be received within a suitable groove formed upon the adjacent edge of the next shingle, the tongue being formed by bending down upon the dotted line 13, the projection 11, and then bending the remaining portion outward upon the line 14, thus forming an L-shaped locking tongue, which I have indicated by the numeral 12.

The L-shaped tongue 12 is received within a groove formed upon the side edge of the first shingle, the same being indicated, in general, by the numeral 15.

By referring to Figure 6 it will be noted that this groove is formed by first bending the projection 16 back upon the line 17, then down upon the line 18, outward upon the line 19, upward on the line 20, and then back toward the main body upon the line 21, thus leaving a free portion 22 the edge of which is slightly spaced from the first bend to permit the passage therebetween of the locking tongue 12.

As disclosed in Figure 4, the portion 22 lies in a plane parallel with the bottom face of the shingle body, thus permitting the face of the next shingle, when locked thereto, to lie within the same plane as the face of the first shingle. Furthermore, the portion 22 serves to support the side of the adjacent shingle and prevents its weight from falling upon the locking tongue 12.

In constructing a roof with my improved shingles it will be apparent, by referring to Figure 1, that all of the trimmings, such as the ridge strip, the hip, gable and valley strips are first applied to the sheathing and then the shingles are applied, particularly the ridge strip 23. After the shingles are applied the eave strip (not shown) is then applied.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

A shingle of the class described having a main body portion provided with projections formed upon all edges and adapted to cooperate with portions of adjacent shingles, the projection formed upon one end being bent downwardly at right angles to said body portion and then bent back under said body portion and inclined upwardly thereunder, said underlying portion again being bent downwardly to form a portion parallel to the first said downwardly bent portion and then bent forwardly to form a forwardly extending flange, said inclined portion receiving thereunder one end of an adjacent shingle and forming a positive lock between the two.

In testimony whereof I affix my signature.

ROY B. BUCKLEY.